(12) United States Patent
Draper

(10) Patent No.: US 7,886,680 B2
(45) Date of Patent: Feb. 15, 2011

(54) MOORING OF ARRAYS OF BUOY-LIKE WECS

(75) Inventor: Mark R. Draper, Kenilworth (GB)

(73) Assignee: Ocean Power Technologies, Inc, Pennington, NJ (US)

( * ) Notice: Subject to any disclaimer, the term of this patent is extended or adjusted under 35 U.S.C. 154(b) by 0 days.

(21) Appl. No.: 11/710,847

(22) Filed: Feb. 26, 2007

(65) Prior Publication Data

US 2007/0224895 A1    Sep. 27, 2007

Related U.S. Application Data

(60) Provisional application No. 60/777,090, filed on Feb. 27, 2006.

(51) Int. Cl.
*B63B 21/00*     (2006.01)
*B63B 21/50*     (2006.01)
*B63B 22/04*     (2006.01)
*F03B 13/14*     (2006.01)

(52) U.S. Cl. .................. 114/293; 114/230.1; 114/230.2

(58) Field of Classification Search .................. 441/30, 441/1; 290/42, 53; 114/293, 230.1, 230.2; 60/495–505

See application file for complete search history.

(56) References Cited

U.S. PATENT DOCUMENTS

| 5,054,415 | A  | * | 10/1991 | Marshall ..................... 114/293 |
| 6,170,424 | B1 | * | 1/2001 | Boerseth ..................... 114/293 |
| 6,647,716 | B2 | * | 11/2003 | Boyd .......................... 60/398 |
| 6,857,266 | B2 | * | 2/2005 | Dick ........................... 60/496 |
| 7,293,960 | B2 | * | 11/2007 | Yamamoto et al. ............ 416/85 |

FOREIGN PATENT DOCUMENTS

| GB | 2383978 A | * | 7/2003 |
| GB | 2400823 A | * | 10/2004 |
| JP | 2002188557 A | * | 7/2002 |
| JP | 2004176626 A | * | 6/2004 |

* cited by examiner

*Primary Examiner*—Ajay Vasudeva
(74) *Attorney, Agent, or Firm*—Henry I. Schanzer

(57) ABSTRACT

For reducing the number of components required for mooring (by means of three, 120° spaced apart mooring lines) multiple floating wave energy converters (WECs), a group of six WECs is disposed in a hexagonal pattern with each WEC being disposed at a corner of the hexagon. The WECs are connected to one another by mooring lines extending along sides of the hexagon, each WEC thereby being connected by two, 120° spaced apart mooring lines and with each WEC serving as a mooring point for each of its two adjacent neighbors. A third mooring line for each WEC, spaced 120° from the other two mooring lines, is connected to an auxiliary surface buoy and thence to an anchor.

7 Claims, 5 Drawing Sheets

MOORING OF ARRAYS OF BUOY-LIKE WECS

This invention claims priority from provisional application Ser. No. 60/777,090 for Mooring of Arrays of Buoy-like WECs filed Feb. 27, 2006 whose material is incorporated herein by reference.

BACKGROUND OF THE INVENTION

This invention relates to wave energy converters (WECs) for converting energy in the waves on the surface of bodies of water to useful energy, and particularly to the mooring or anchoring of WECs of the floating buoy type.

One known type of WEC, with which the present invention is primarily concerned, comprises a buoy on which is mounted a part driven into movement in response to passing surface waves. The moving part drives an energy transducer for generating useful energy. For retaining the buoy in place, a common practice is to moor the buoy using three, 120-degree spaced apart mooring lines or cables, with each line being connected to an anchor by means of an intermediate "auxiliary surface buoy" (ASB) for supporting the weight of the mooring line. A problem with this mooring arrangement, however, is that if a plurality of WECs is used, for increasing the amount of generated power, a mooring arrangement using three anchors and three ASBs for each WEC is both expensive and space consuming. The present invention provides an improved arrangement for mooring groups of WECs.

SUMMARY OF THE INVENTION

In accordance with one embodiment of the present invention, six separate WECs are disposed in a hexagonal pattern, with each WEC being disposed at a corner of the hexagon. The WECs are interconnected by mooring lines with each WEC thus serving as a mooring for each of its two adjacent neighbors. This provides two of the three mooring lines required for maintaining each WEC in place. The third mooring line is connected to an auxiliary surface buoy (ASB) and thence to an anchor. Accordingly, while each of the six WECs is maintained in place by three mooring lines, the total number of anchors, and the corresponding number of ASBs, is six rather than six times three or eighteen.

DESCRIPTION OF THE DRAWING

The drawings are schematic and not to scale.

DETAILED DESCRIPTION

Figure 1:
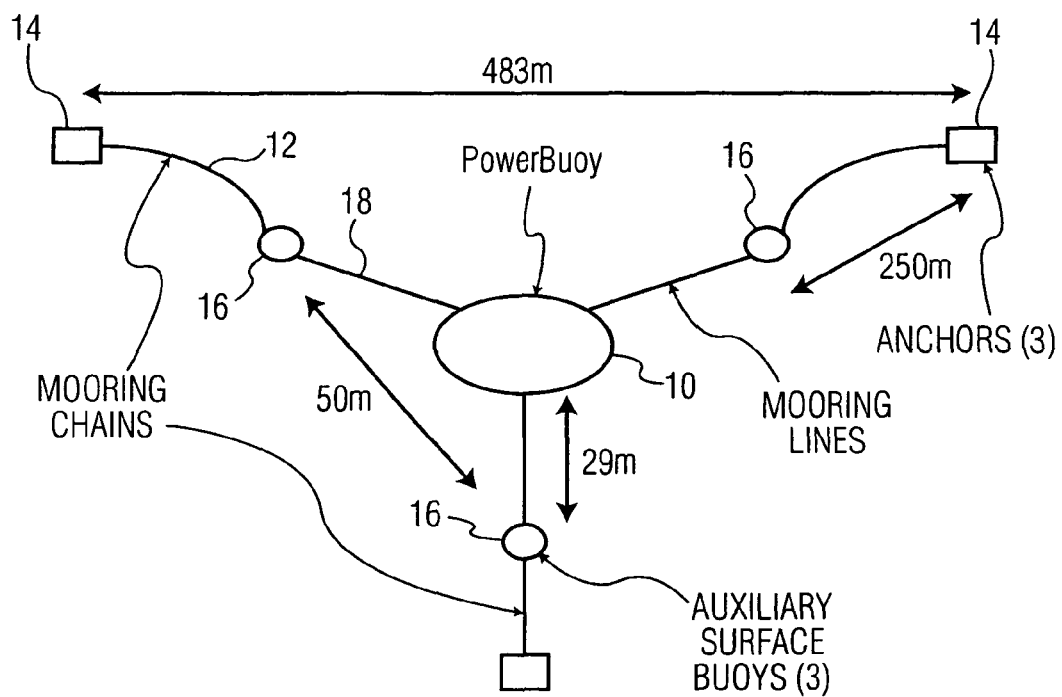
FIG. 1 shows a known arrangement for mooring a single WEC.
Figure 1A:
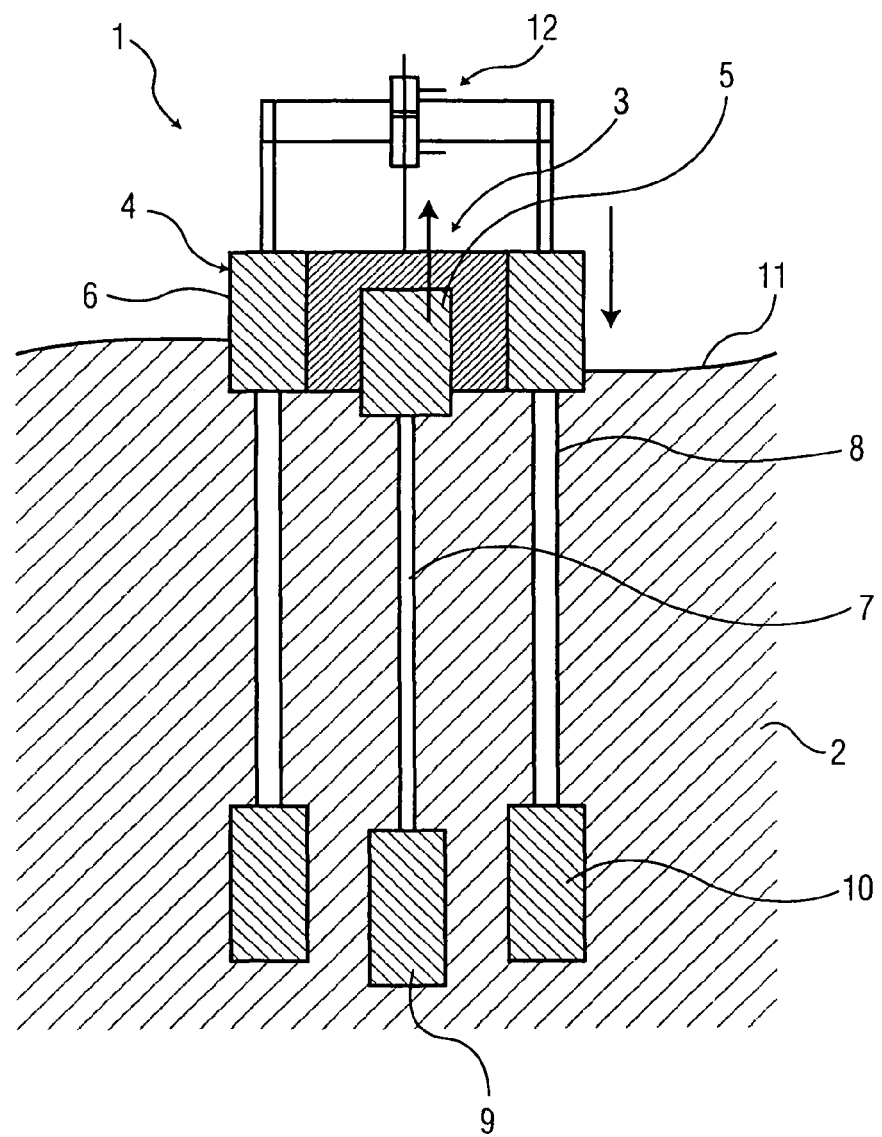
FIG. 1A shows a prior art WEC.

A prior art arrangement for mooring or anchoring a single WEC 10 (of FIG. 1A shows a prior art WEC, as shown in U.S. Pat. No. 6,857,266, herein incorporated by reference in its entirety. Vertically extending mooring lines 12 (also referred to as "chains" or "cables") are affixed to the seabed by anchors 14 designed for the particular seabed geology. The significant weight of these mooring lines is carried by three auxiliary surface buoys (ASBs) 16, to which the upper ends of the lines are attached, to avoid any sinking load being transferred to the WEC. The WEC 10 is retained in place by horizontal mooring lines 18 extending between each ASB 16 and the WEC 10. The lines 18 are of short length and weight for not weighting down the WEC. This mooring arrangement is generally satisfactory, but it requires a relatively large space and is relatively expensive, particularly if a number of WECs are to be used in a "farm" of WECs for generating large amounts of power. Additionally, if any interconnections between the WECs are required, these will be over long distances and have no obvious route.

Figure 2:
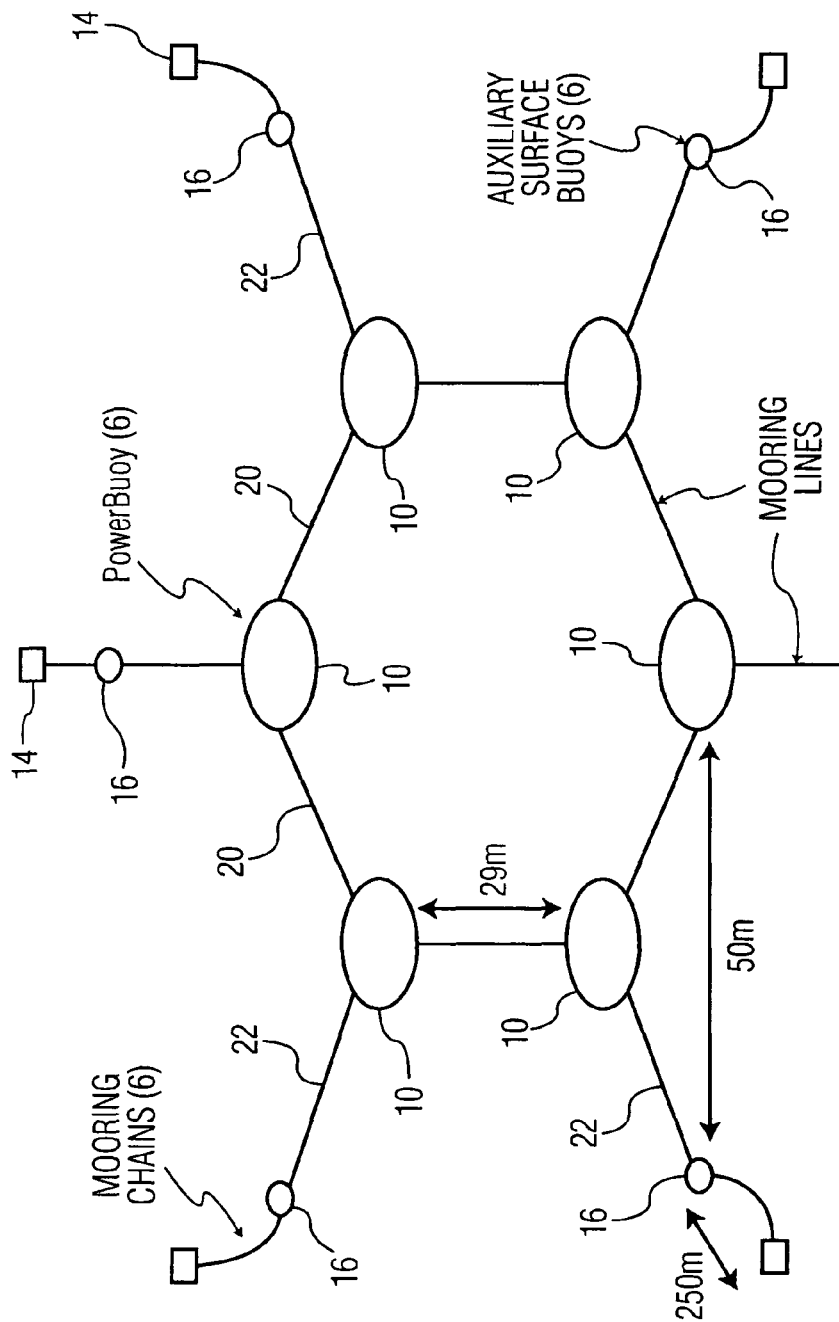
FIGS. 2-5 show various arrays of WECs in accordance with the present invention.

An arrangement according to the present invention is shown in FIG. 2. As shown, six WECs 10 are disposed in a hexagonal pattern and attached to one another by mooring lines or cables 20. Thus, each WEC serves as a mooring point for its neighbor by means of pairs of cables. Owing to the hexagonal pattern of WECs, the two interconnecting cables 20 for each WEC are disposed 120 degrees apart. A third mooring cable 22, spaced 120 degrees from each of the cables 20, is connected between each WEC 10 and a respective anchor 14 via an intermediate ASB 16. Accordingly, each WEC is retained in place by three, 120 degree spaced apart mooring cables 20, 20, 22. Significantly, however, for the array of six WECs, only six ASBs 16 and six anchors 14 are required for the whole array—as opposed to eighteen needed for six WECs each moored as shown in FIG. 1.

Additionally, because of the fewer ASBs and anchors required for the array of six WECs within the hexagonal pattern, the WECs can be spaced relatively closely together, making the array on the surface quite compact. For example, in one hexagonal grouping of WECs, the six WECs fit on a circle of a diameter of 60 m and require 2500 square meters of space. In comparison, six comparably sized individual WECs moored as shown in FIG. 1 require a space of around 90,000 square meters.

Further advantages are:

The number of anchoring points is reduced from three per WEC to one. A more substantial individual anchoring arrangement is required because of the greater loading of each anchor, but significant savings are still obtained because of the reduction of components and installation costs.

The number of ASBs used is reduced to one per WEC from three. While this requires a heaver grade of mooring chain, along with a somewhat larger ASB, the overall cost is still significantly reduced. The six anchoring points enable a stronger anchoring strength in any particular direction to the oncoming wind and waves. The six rather than three point anchoring halves the angle of separation of anchor directions and therefore enables one anchor to be much closer to "directly upstream".

Figure 3:
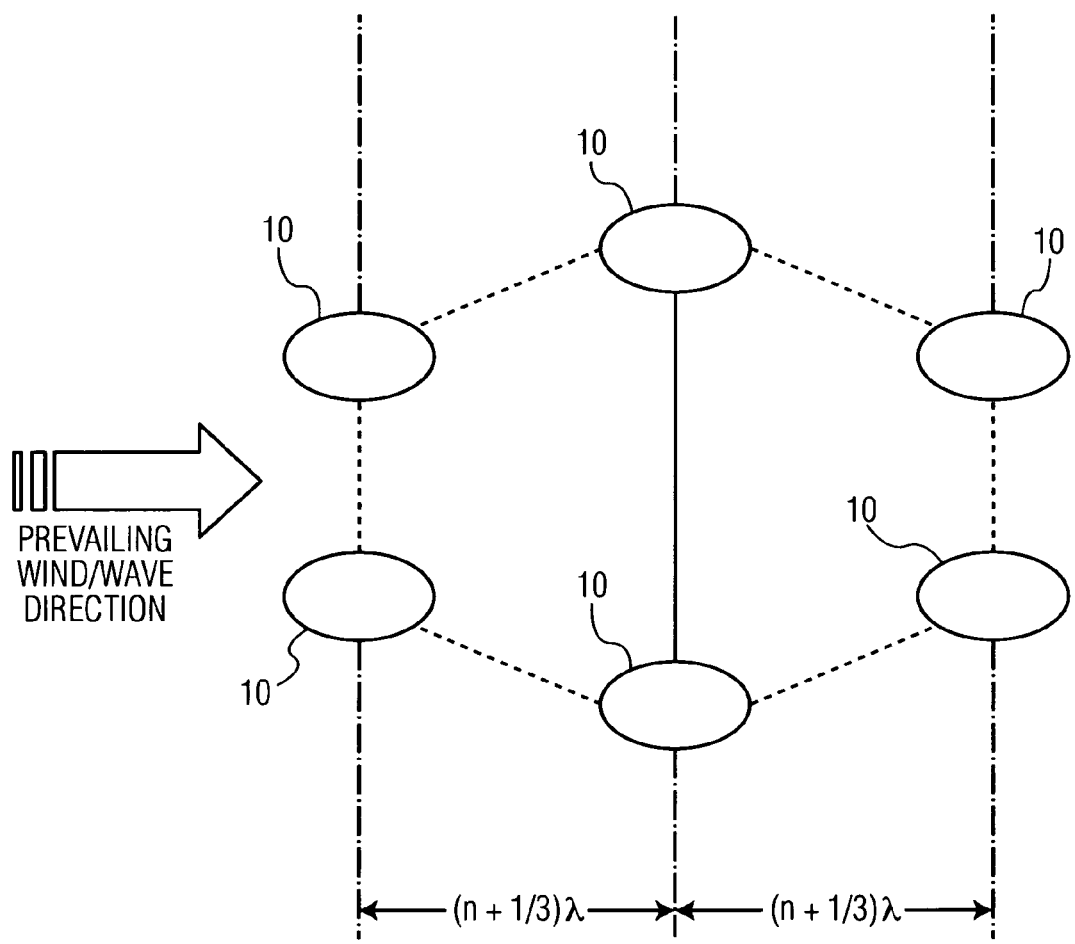

The distance between WECs is selected to give the right "spread" over the oncoming wave front for providing maximum wave energy capture by each WEC. The direction of the array is aligned based upon the prevailing wind-wave direction. This is illustrated in FIG. 3 which shows an example of a hexagonal array of WECs of such size that the minimum distance between the WECs is 29 m. In the FIG. 3 arrangement, three pairs of WECs are shown from left to right. The second pair of WECs is out of phase with the first pair of WECs by one third of the typical wavelength, and the third pair by another one third. A reason for such spacings is that if the WECs were set so that they are a whole wavelength apart, they will all produce power at the same instantaneous rate, ranging from zero to maximum. By spacing them apart as described, different pairs will produce different amounts of power at any instant. The effect of this is that, subject to instantaneous variations in the passing surface waves, variations in the power outputs of the various WECs are blended to get a continuous, smooth output over time, instead of massive peaks followed by zero power.

As indicated in FIG. 3, the spacing between pairs of WECs is $(n+\frac{1}{3})\lambda$, where n is an integer and $\lambda$ is the typical wavelength at the site. The integer n is set at the minimum to ensure that $(n+\frac{1}{3})\times\lambda$ is equal to or greater than 25.

For example:

If $\lambda$ equals ten meters at the site, n is preferably set at three, giving the rows a separation of thirty three meters.

If $\lambda$ equals twenty meters at the site, n would be set at two, giving the rows a separation of forty-six meters.

Figure 4:
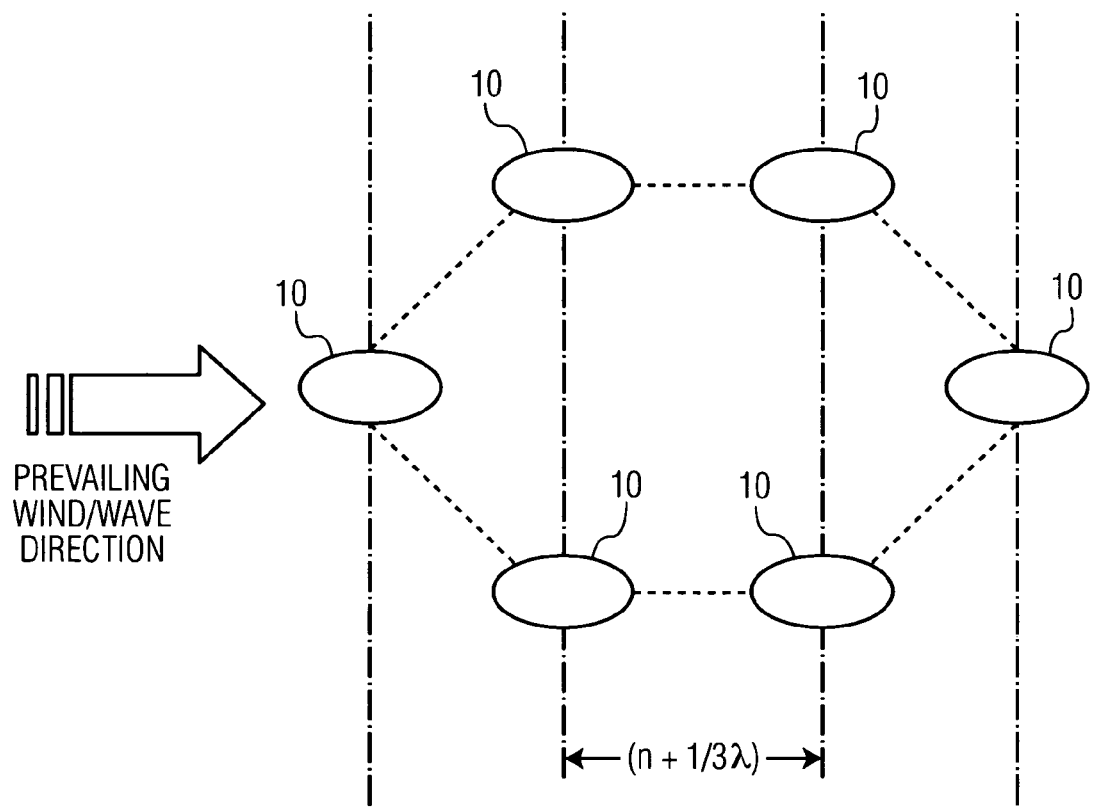

FIG. 4 shows a different orientation of the array of WECs with a single WEC being "upwind". The arrangement shown in FIG. 4 is not as well tuned as the arrangement shown in FIG. 3 because the leading and trailing WECs cannot be accurately set the whole wave length apart. This is because the spacing of these WECs is determined by the hexagonal shape and the separation of the second and third rows.

For devices that deliver a symmetrical power output on rising and falling waves, then it may be possible to space on a one sixth wavelength rather than a one third wavelength. This can be designed based on the particular WEC in use.

Figure 5:
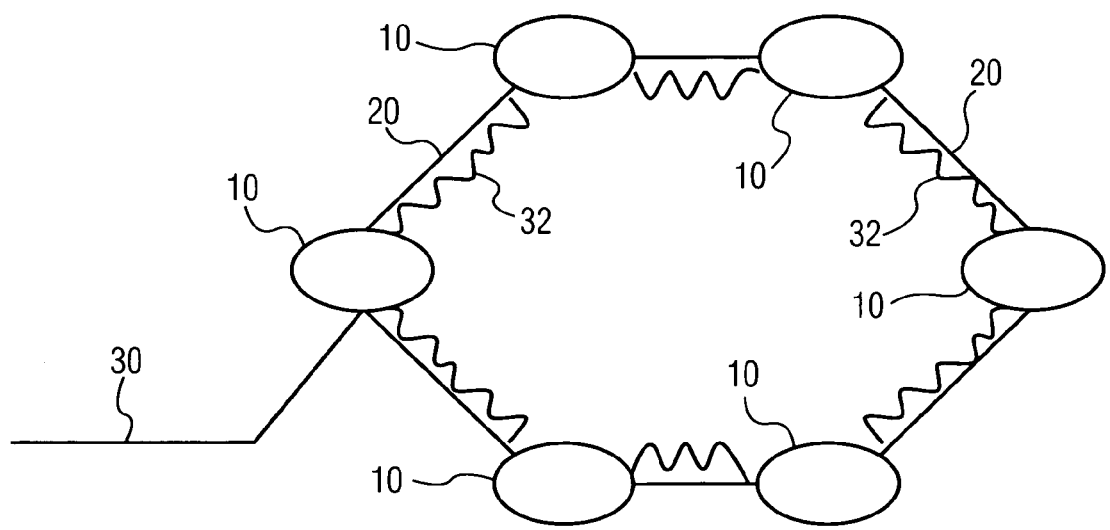

FIG. 5 shows still another arrangement with only one cable 30 up from the seabed connected to one WEC. The other WECs are interconnected at the surface by cables run on, and supported by, the mooring lines.

If a transformer is required, this can be housed in the WEC to which the cable is connected, which could also house any central control and monitoring means.

The array shown in FIG. 5 must remain intact even if one WEC is removed for maintenance, but this can be achieved by replacing the WEC removed with another WEC, or just another "dummy" place-holder, which can be a simple float to connect the three mooring lines. The electrical connections could be left off, or connected directly together, to maintain the ring even when one WEC is removed.

What is claimed is:

1. An array of buoyant wave energy converters (WECs), said array comprising six buoyant WECs, each one of said WECs including a heaving buoy floating on the surface of a body of water having a moving member responsive to the waves for generating useful energy, said WECs serving as mutual mooring points for one another, said WECs being disposed one each at a corner of a hexagonal pattern and interconnected to one another by mooring lines extending along sides of the hexagon, said side extending lines providing two, 120° spaced apart mooring lines for each WEC, and a third mooring line spaced 120° from each of the other said mooring lines connected between each WEC and an auxiliary buoy, each auxiliary buoy being connected in turn to a respective anchor by a descending anchoring line, with all the WECs of the array being similarly interconnected, the auxiliary buoys preventing the mooring lines from weighing down the WECs, wherein the direction of the array of WECs is aligned based upon the prevailing wind-wave direction, and wherein the WECs are positioned such that the distance between adjacent pairs of WECs is substantially equal to one third of the typical wave length such that different pairs of WECs will produce different amounts of power at any instant.

2. An array of WECs in accordance with claim 1 wherein each one of said third mooring lines is a surface extending mooring line.

3. An array of WECs in accordance with claim 1, wherein the WECs are positioned such that the distance between the WECs is selected to smooth out the power produced by the array of WECs.

4. An array of WECs in accordance with claim 1, wherein any of the WECs of an array may be replaced by another WEC or a dummy WEC to maintain the hexagonal layout of the array.

5. An array of buoyant wave energy converters (WECs), said array comprising six buoyant WECs, each one of said WECs including a heaving buoy floating on the surface of a body of water having a moving member responsive to the waves for generating useful energy, said WECs serving as mutual mooring points for one another, said WECs being disposed one each at a corner of a hexagonal pattern and interconnected to one another by mooring lines extending along sides of the hexagon, said side extending lines providing two, 120° spaced apart mooring lines for each WEC, and a third mooring line spaced 120° from each of the other said mooring lines connected between each WEC and an auxiliary buoy, each auxiliary buoy being connected in turn to a respective anchor by a descending anchoring line, with all the WECs of the array being similarly interconnected, the auxiliary buoys preventing the mooring lines from weighing down the WECs, wherein the WECs are positioned such that the distance between adjacent pairs of WECs is $(n+\frac{1}{3})\lambda$, where n is an integer, $\lambda$ is the typical wave length at the site, and n is set at the minimum to ensure that $(n+\frac{1}{3})\lambda$ is equal to or greater than 25 to smooth out the power produced by the array of WECs.

6. An array of WECs in accordance with claim 5 wherein each one of said third mooring lines is a surface extending mooring line.

7. An array of WECs in accordance with claim 5, wherein any of the WECs of an array may be replaced by another WEC or a dummy WEC to maintain the hexagonal layout of the array.

* * * * *